(12) United States Patent
Kuzmin

(10) Patent No.: US 7,519,748 B2
(45) Date of Patent: Apr. 14, 2009

(54) STROKE-BASED DATA ENTRY DEVICE, SYSTEM, AND METHOD

(75) Inventor: Yevgeniy Pavlovich Kuzmin, Staten Island, NY (US)

(73) Assignee: Microth, Inc., Staten Island, NY (US)

( * ) Notice: Subject to any disclaimer, the term of this patent is extended or adjusted under 35 U.S.C. 154(b) by 207 days.

(21) Appl. No.: 11/570,287

(22) PCT Filed: Jun. 16, 2005

(86) PCT No.: PCT/US2005/021400

§ 371 (c)(1),
(2), (4) Date: Dec. 8, 2006

(87) PCT Pub. No.: WO2006/009813

PCT Pub. Date: Jun. 26, 2006

(65) Prior Publication Data

US 2008/0075368 A1    Mar. 27, 2008

Related U.S. Application Data

(60) Provisional application No. 60/581,064, filed on Jun. 18, 2004.

(51) Int. Cl.
*G06F 13/12* (2006.01)

(52) U.S. Cl. .......................................... 710/67; 345/173

(58) Field of Classification Search ........................ None
See application file for complete search history.

(56) References Cited

U.S. PATENT DOCUMENTS

| | | | |
|---|---|---|---|
| 4,674,112 A | 6/1987 | Kondraske et al. | |
| 5,596,656 A | 1/1997 | Goldberg | |
| 5,764,794 A | 6/1998 | Perlin | |
| 5,982,303 A | 11/1999 | Smith | |
| 6,044,174 A | 3/2000 | Sinden | |
| 6,057,845 A | 5/2000 | Dupouy | |
| 6,215,901 B1 | 4/2001 | Schwartz | |
| 6,246,395 B1 * | 6/2001 | Goyins et al. | ................ 345/173 |
| 6,295,372 B1 | 9/2001 | Hawkins et al. | |
| 6,366,697 B1 | 4/2002 | Goldberg et al. | |
| 6,477,274 B1 | 11/2002 | Kim et al. | |
| 6,493,464 B1 | 12/2002 | Hawkins et al. | |

(Continued)

FOREIGN PATENT DOCUMENTS

JP    61120079 A    7/1986

(Continued)

*Primary Examiner*—Eron J Sorrell
(74) *Attorney, Agent, or Firm*—Alston & Bird LLP

(57) ABSTRACT

A data entry system comprising of: an input surface, a limited number of input elements of any shape and positions at the input surface, and a processing device (for detecting a continuous sweeps of an input object over the input surface, for tracking a sequence of the input elements interacted with the input object during such sweeps, and for generating a function associated with the sequence after the sweep is completed). A system characterized in that the processing device is adapted for time independent and reliable detecting a sequence of input elements, even if an input object could interact with several input elements simultaneously. A system also characterized in that the sweeps may represent strokes of handwritten symbols. The invention can be utilized in new designs of compact data input systems for electronic devices.

54 Claims, 9 Drawing Sheets

U.S. PATENT DOCUMENTS

| | | |
|---|---|---|
| 6,580,826 B1 | 6/2003 | Sinden |
| 6,646,633 B1 | 11/2003 | Nicolas |
| 6,654,496 B1 | 11/2003 | Goldberg |
| 6,731,803 B1 | 5/2004 | Aharonson et al. |
| 2002/0145592 A1 | 10/2002 | Schauer |
| 2002/0196978 A1 | 12/2002 | Hawkins et al. |
| 2003/0064686 A1 | 4/2003 | Thomason et al. |
| 2003/0095096 A1 | 5/2003 | Robbin et al. |
| 2004/0140956 A1* | 7/2004 | Kushler et al. .............. 345/168 |
| 2004/0252109 A1* | 12/2004 | Trent et al. .................. 345/174 |

FOREIGN PATENT DOCUMENTS

| | | |
|---|---|---|
| WO | WO 99/56238 A1 | 11/1999 |

\* cited by examiner

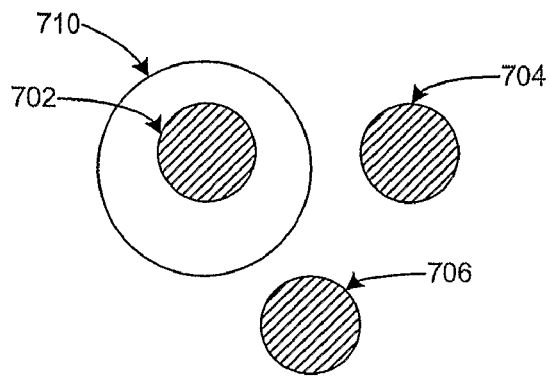
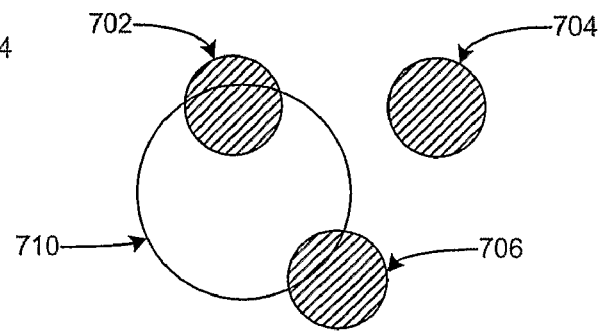
FIG. 16a            FIG. 16b
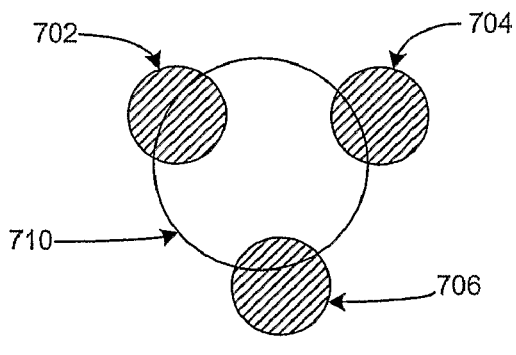
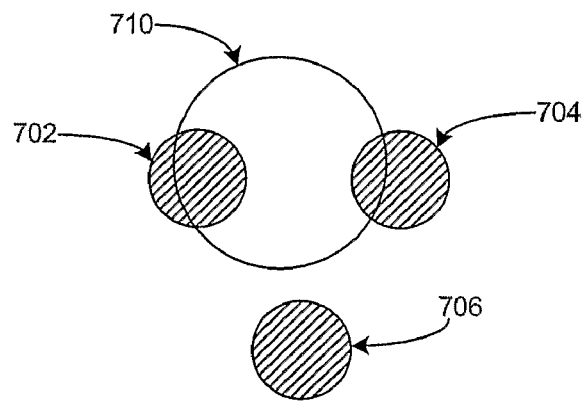
FIG. 16c            FIG. 16d
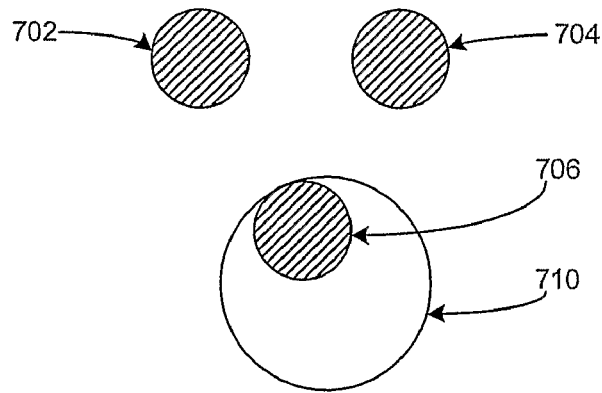
FIG. 16e

STROKE-BASED DATA ENTRY DEVICE, SYSTEM, AND METHOD

CROSS-REFERENCE TO RELATED APPLICATIONS

This application is a National Stage Filing under 35 U.S.C. § 371 of PCT/US05/21400, filed Jun. 16, 2005, which application claims priority from U.S. Provisional Application No. 60/581,064 filed Jun. 18, 2004, all previous applications are hereby incorporated herein in their entireties by reference.

FIELD OF THE INVENTION

The present invention relates generally to systems and methods for data entry for electronic devices and, more particularly, embodiments of the present invention relate to devices, systems, and methods for stroke-based data entry for compact electronic devices using broad input implements.

BACKGROUND

As the functionality of electronic devices continues to increase, most such devices require alphanumeric input and extended controls. Several solutions for data entry for such devices exist like compact keyboards, handwriting recognition, and voice recognition.

Among the possible solutions, handwriting recognition is one of the more popular solutions because it is intuitive, fast, and requires a small footprint on a device. However, handwriting recognition is typically restrictive, requiring sophisticated processing and hardware as well as being less accurate and less flexible than keyboard input.

A primary problem of handwriting recognition is that processing algorithms are quite sophisticated and require considerable processing power. Moreover, even the best algorithms have less than a 100% recognition ratio. Another problem is that handwriting recognition systems are difficult to customize to individual writing styles. All systems are language (alphabet) dependent and require separate, additional modules for every new language. In addition, handwriting recognition requires a high-resolution, sensitive display for symbol input.

Different methods have been proposed to solve the aforementioned problems. Many approaches, such as Unistroke™ from the Xerox Corporation and Graffiti™ from Palm, Inc., require inputting only special, simplified strokes. In these approaches, symbols are typically represented by only one stroke. Using only one stroke simplifies the processing algorithms, but necessitates memorization of the default set of strokes, which precludes easy implementation of these methods by new users.

Due to the complexity of symbol description for traditional handwriting recognition systems and the nature of recognition algorithms, no existing system has 100% recognition ratio, and most typical handwriting recognition systems have much lower recognition ratios that makes these systems unappealing to users.

Some systems provide limited customization of symbols and functions, but that typically increases the complexity of both the system and the hardware requirements.

Some approaches are based on recognition of symbol shapes at a low-resolution rectangular sensitive matrix. Additional restrictions are added on symbol shapes as well as requiring user-memorization of symbol shapes. Due to input limitations, these solutions have simpler processing algorithms and a higher recognition ratio but are usually time-dependent upon the input by the user. As such, these systems typically are not considered to be highly user-friendly in a manner that would appeal to typical users.

Other approaches are based on processing sequences of elements of low-resolution rectangular sensitive matrix. These approaches do not provide natural multi-stroke recognition and customization. These approaches require adjacency of sensitive elements, but do not work correctly with wide input objects like fingers which could activate several elements of the matrix simultaneously.

Further, typical methods for handwriting recognition require the use of a stylus or pen as an input device and a high resolution input device such as a pressure sensitive or resistive touchpad. By using a stylus on a high resolution input device, a processing algorithm may be defined by curve approximations for the symbols represented by single strokes. The need for a stylus is a problem for users of devices such as mobile phones which are typically not used with a stylus and may typically be used with one hand for single-hand entry and operation. For example, a user typically can hold a mobile phone in one hand and operate the device or enter information using the same hand, typically with the thumb of the hand holding the device.

Accordingly, improved data entry systems and associated methods are desired to provide data entry for small electronic devices such mobile phones.

SUMMARY

In light of the foregoing background, embodiments of the present invention provide improved devices, systems, and methods for stroke-based data entry for portable electronic devices.

It is an objective of the present invention to provide a small, user-friendly, intuitive data entry device and system especially for, but not limited to, hand-held devices.

A second objective of the present invention is to provide a data entry system that is suitable for input of multi-stroke symbols including natural handwritten symbols created by an input object of any width with minimal limitations for input stroke shapes, sizes, and positions.

An additional objective of the present invention is to provide a compact data entry system with a limited number of input elements, which could have any shape and/or position and could be non-adjacent or adjacent.

It is a further objective of the present invention to provide a compact data entry system that has simple time-independent processing algorithms, minimal hardware requirements, and an effective recognition rate for viable user operation.

A further objective of the present invention is to provide a compact data entry system that is both language and alphabet independent while also being capable of simple customization to individual handwriting styles.

An embodiment of the present invention provides a data entry system that may include an input surface, a limited number of input elements located about the input surface, and a processing device. The processing device may detect continuous sweeps of an input object over the input surface. Such a data entry system may track a sequence of input elements activated by an input object during sweeps, and such a data entry system may generate a function associated with sequences of input sweeps. Sweeps represent strokes of handwritings of the symbols (alphanumeric, numeric, etc.) and functions in the data entry system.

An embodiment of a system of the present invention may detect interaction of data entry with input elements from the moment an input object starts interaction with an input surface to the time when the input object stops or discontinues interaction with the input surface. A processing device of an embodiment of a system of the present invention may be adapted to detect a sequence of input elements while disregarding an input object interacting with more than one input elements simultaneously. A processing device of an embodiment of the present invention may detect interaction of an input object with an input element until the processing device detects that the input object interacts independently with a subsequent input object without simultaneously interacting with another input element. In an embodiment of a data entry system of the present invention, input elements may cover and be positioned about an input surface in a manner that an input object, interacting with the input surface, interacts with at least one input element of the input surface at any time.

In an embodiment of a data entry system of the present invention, an input surface, associated input elements of the input surface, and a processing device may be capable of accepting and detecting data input by an input object characterized by sweeps (one or more strokes) of the input object across input elements of the input surface. The movement of an input object across the input surface may be defined for a data entry system of the present invention to represent different symbols such as alphanumeric representations of letters and numbers for one or more languages. A data entry system of the present invention may include a stroke dictionary or symbol dictionary which associates input object interaction with an input surface with intended symbols. A data entry system of the present invention may accept data input by an input object selected from the group consisting of a finger, thumb, stylus, pen, laser pointer, cursor, image of an object, and two dimensional shapes. Interaction of an input surface by an input object may be detected by any of the methods selected from the group of electronic, electromechanical, proximity, mechanical, and visual. Shapes of input elements may be planar or a dot, or a line. The external surface of an input surface that interacts with an input object may be smooth; textured; a single, continuous volume of material; or multiple input surface materials arranged to create a single, discontinuous volume of material. An input surface may include grooves, bumps lines, or dots which define boundaries of input element zones and/or to provide tactile feedback. An input surface may be smooth, bumped, ribbed, grooved, concave, convex or curved. An input surface may be equipped with back-lighting to provide visual feedback.

An embodiment of a data entry system of the present invention may include a processing device comprising an electronic circuit which registers and processes interactions between an input surface and an output object. A processing device may be combined with the input surface or the input object, or the processing device may be a separate device from the input surface and input objects.

An embodiment of a data system of the present invention may use processing functions that represent handwriting by sweeps of an input object.

An embodiment of the present invention may comprise a data entry system on a compact electronic device. A compact electronic device may be selected from the group consisting of a portable electronic device, a mobile phone, a pager, a personal data assistants (PDA), a media player, a portable medical device, a portable computer a global positioning system (GPS) device, a dictionary, a translator device, a personal information manager, a labeler, and a watch. Other like compact electronic device, including devices that are combinations of the aforementioned devices, may be used with embodiments of the present invention.

Embodiments of methods for data entry of the present invention corresponding to the above-described systems of the present invention are provided herein and further described and claimed below.

These characteristics, as well as additional details, of the present invention are further described herein with reference to these and other embodiments.

BRIEF DESCRIPTION OF THE DRAWING(S)

Having thus described the invention in general terms, reference will now be made to the accompanying drawings, which are not necessarily drawn to scale, and wherein:

Figure 12:
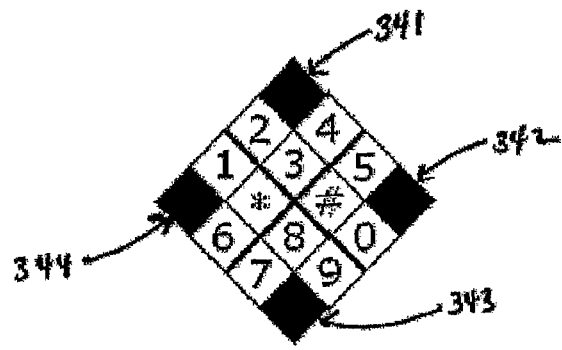
Figure 13:
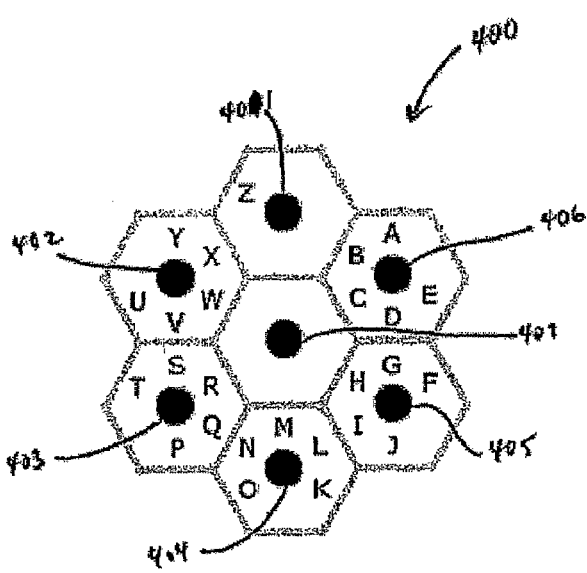
Figure 14:
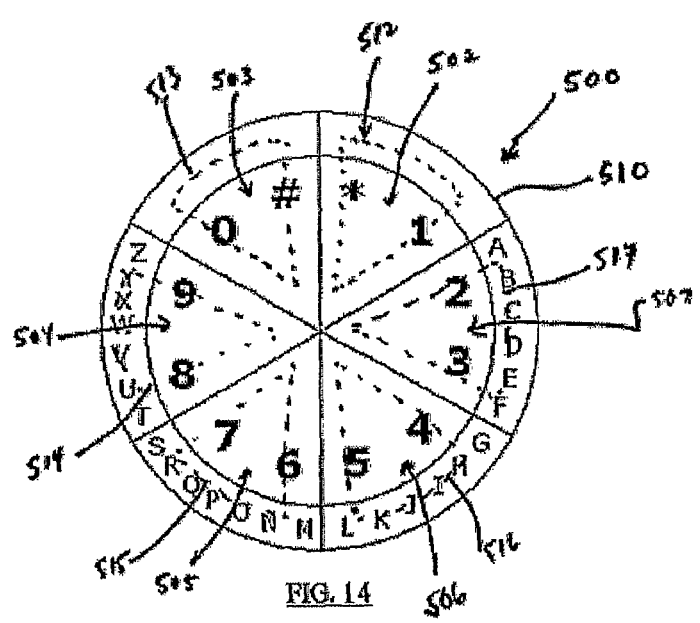
Figure 15:
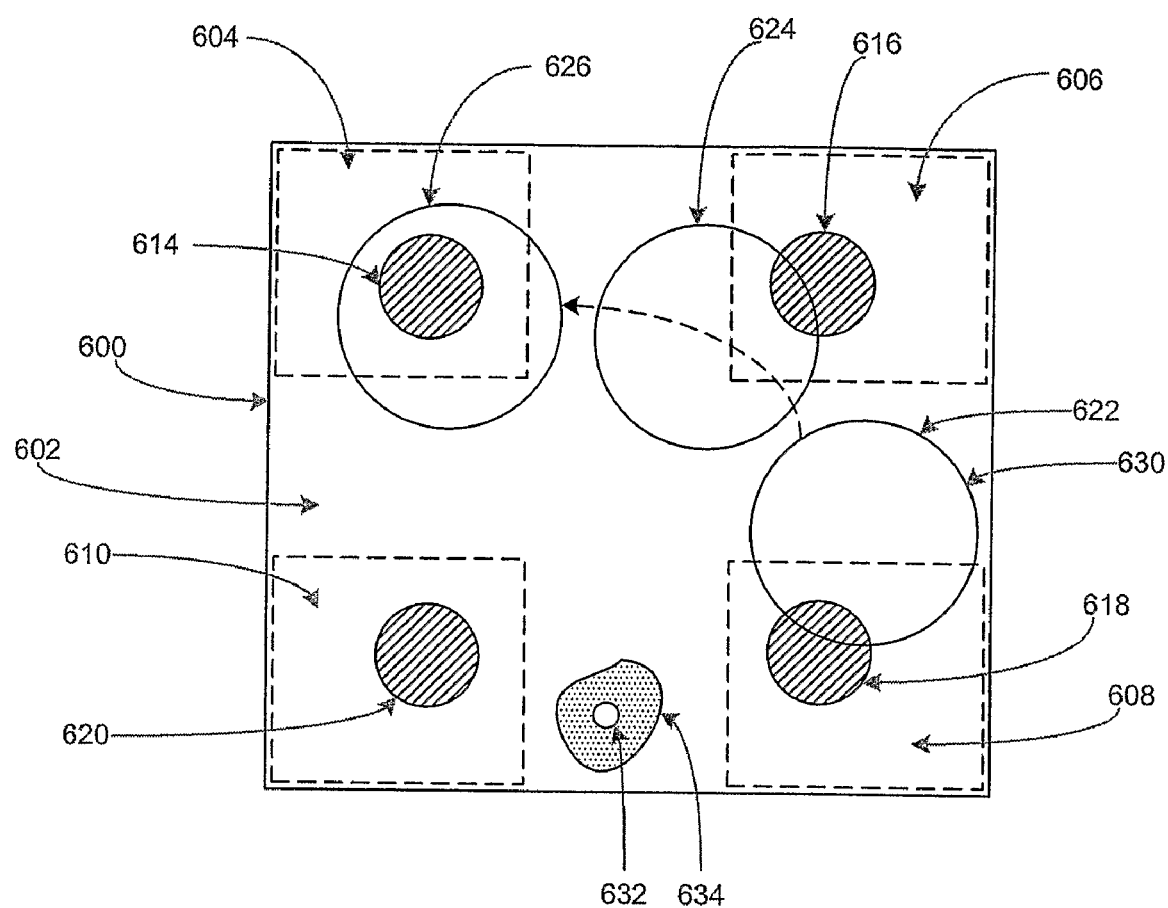
Figure 17:
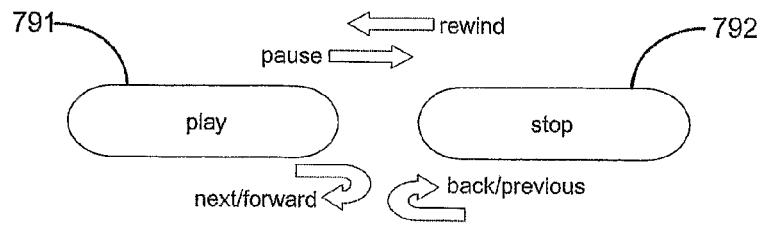
Figure 18:
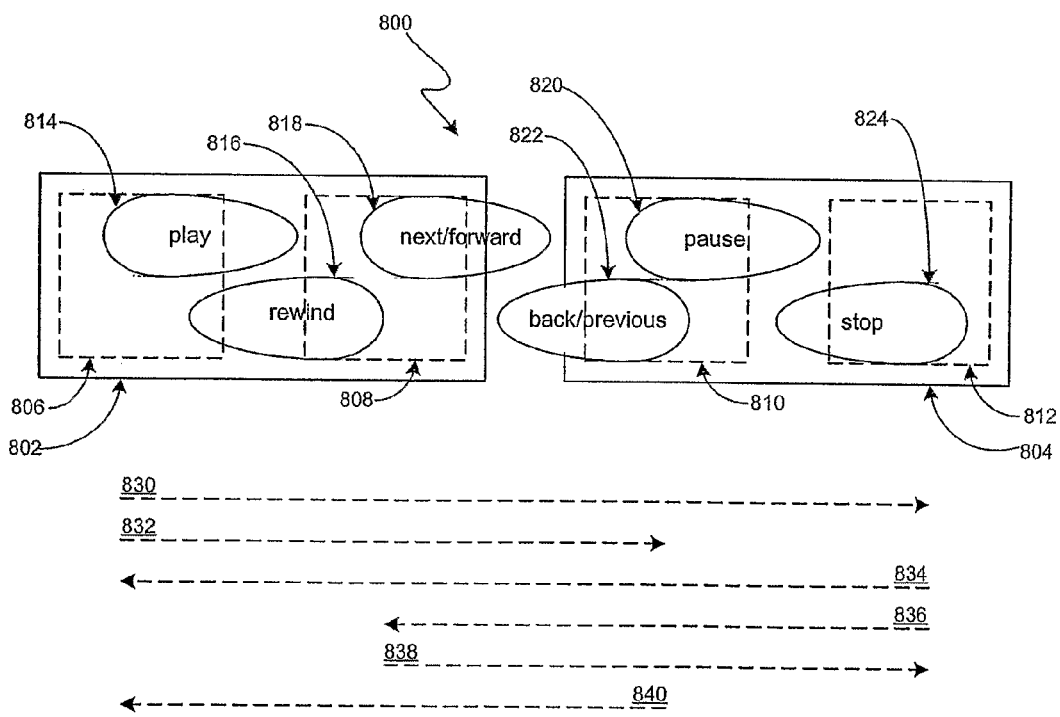
Figure 19:
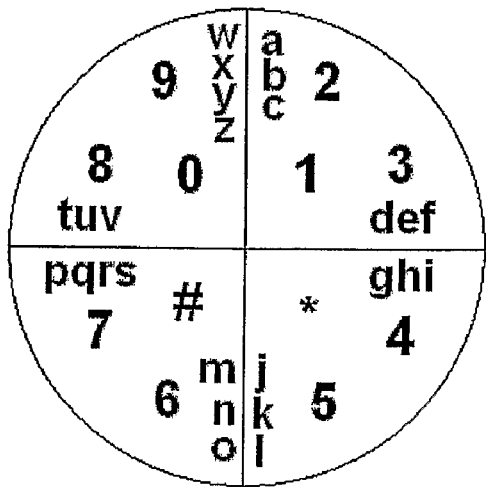
Figure 20:
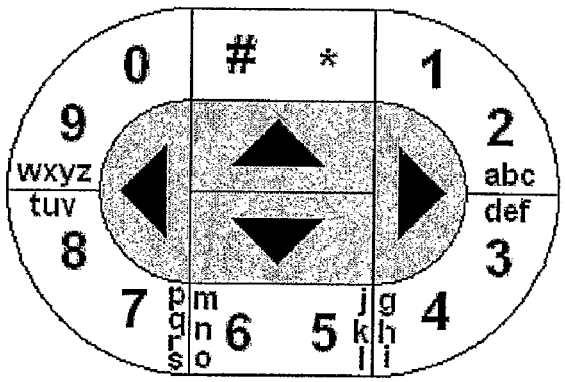
Figure 21:
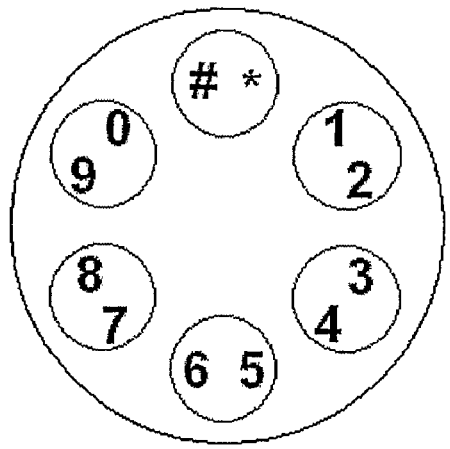

FIG. 10$a$ is a diagram of a data entry input surface with 7 dot input elements based on a 3×5 matrix pattern and associated representations of symbols for a 7 dot input element input surface of an embodiment of the present invention;

FIG. 10$b$ is a diagram of a data entry input surface with 8 dot input elements based on a 3×5 matrix pattern and associated representations of symbols for an 8 dot input element input surface of an embodiment of the present invention;

FIG. 11$a$ is a diagram of a data entry input surface with 6 input elements and associated representations of symbols for a 6 input element input surface of an embodiment of the present invention;

FIG. 11$b$ is a diagram of a data entry input surface with 9 input elements and associated representations of symbols for a 9 input element input surface of an embodiment of the present invention;

FIG. 12 is a diagram of a data entry input surface with 4 dot input elements of an embodiment of the present invention;

FIG. 13 is a diagram of a data entry input surface with 7 input elements utilizing a hexagonal pattern of an embodiment of the present invention;

FIG. 14 is a diagram of a data entry input surface with 6 input elements utilizing a circular pattern of an embodiment of the present invention;

FIG. 15 is a diagram of a data entry input surface with four data entry input zones interacting with two input objects;

FIGS. 16*a*, 16*b*, 16*c*, 16*d*, and 16*e* are diagrams of interaction between three data entry input zones and an input object at various positions among the three data entry input zones;

FIG. 17 is a diagram of a data entry input surface with two input elements of an embodiment of the present invention;

FIG. 18 is a diagram of a data entry input surface with four input elements of an embodiment of the present invention;

FIG. 19 is a diagram of a data entry input surface of an embodiment of the present invention with four input elements utilizing a circular pattern;

FIG. 20 is a diagram of a data entry input surface of an embodiment of the present invention with ten input elements utilizing two oval patterns; and FIG. 21 is a diagram of a data entry input surface of an embodiment of the present invention with six input elements forming a rotating dial, circular pattern.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While a primary use of the present invention may be in the field of data entry for compact electronic devices such as mobile phones and portable computers, it will be appreciated from the following description that the invention is also useful for many types of devices that are generally referenced herein as compact electronic devices, including without limitation, for example, mobile phones, pagers, handheld data terminals and personal data assistants (PDAs), media players, portable medical devices, portable personal computer (PC) devices, global positioning system (GPS) devices, electronic dictionary or translator devices, personal information managers, labelers, watches, and other portable electronics, including devices that are combinations of the aforementioned devices. Similarly, while the present invention is particularly useful for compact portable devices, the present invention can be used with other devices and systems and fixed devices and systems, such as used as an input device for a desktop personal computer (PC).

As used herein, a "sweep" of an input object refers to one ore more continuous strokes of an input object. A sweep may be a combination of continuous strokes representing handwriting such as where a single sweep begins when an input object interacts with an input surface and ends when an input object stops or discontinues interaction with an input surface. A single sweep may consist of one stroke of handwriting or multiple strokes of handwriting. For example, a capital I may consist of a single vertical stroke and a capital M may consist of four strokes, two vertical and two angled. Both letters may be said to have been formed by a sweep of an input object. The capital M may be said to have been formed by a sweep or sweeps of an input object, where a sweep singularly refers to the combination of continuous strokes and where sweeps refers in plural to the various strokes that combine to form the sweeps of an M. Using strokes of regular handwritten symbols provides easy and natural interface for a user and simple and reliable processing for a processing device. Alternatively, or in addition, input strokes may be strokes not representative of regular handwritten symbols, such as described with reference to FIGS. 12-14 and 17-21. The term sweep is used herein, rather than stroke, because strokes are typically associated with a single linear or curved movement. Embodiments of the present invention, however, may allow use of input object manipulators which are not limited to single, or multiple, linear or curved movements, but may also include movements characterized as directional or interactive movements.

While embodiments of the present invention may be described and depicted used with the Latin alphabet, embodiments of the present invention may be designed and used with letters, phonetic elements, numbers, and symbols of other languages. Embodiments of the present invention may be used for data entry of any type of data, including functions, and descriptions and depictions of embodiments of the present invention used with the Latin alphabet, numbers, symbols, and functions are merely explanatory and not limiting of other embodiments of the present invention.

The input surface may be a flat or planar surface or any arbitrarily shaped surface; it may be hard or flexible, or partially hard and partially flexible; it may be combined with a display, or be a static surface. Preferably, the input surface is smooth to allow easy, continuous sliding of an input object over the input surface.

Some or all areas or zones of an input surface may be input elements. The number of input elements may be limited to reduce the complexity of an input device or system of an embodiment of the present invention, such as to not exceed nine or ten input elements for many embodiments. Input elements may cover the entire input surface or may cover only a small part of the input surface. Input elements may be adjacent, or input elements may be non-adjacent and separated by areas of the input surface. The input elements may have any shape; input elements may be small dots, such as dots having a diameter approximately 1-2 mm, lines, such as a line having a width of about 1-2 mm, or 2-dimensional (2D) regions of the input surface. Any combination of the aforementioned shapes may be used for input elements. Input elements may be organized into regular or irregular patterns, arrays, or shapes. Input elements may be static, or rendered dynamically in the case of the input surface combined with display. Both the acceptance of an unrestricted variety of shapes and the support of non-adjacent input elements are important advantages of this invention.

An input surface may provide visual and/or tactile feedback to a user about the positions of input elements. Input elements or input zones may have different colors than the rest of the input surface. Dots or painted lines may define the boundaries or other parts of input elements or input zones. With tactile feedback, a user may be able to feel the locations of input elements or input zones. Tactile feedback could be particularly useful for visually impaired users, using devices in the dark, or using devices without needing to visually observe the use. If the input surface is three-dimensionally curved, the user may feel whether or not the input object is positioned correctly to activate a single input element or input zone. Tactile feedback may be generated by such items as molded knobs, grooves, ridges, and/or bumps that define the boundaries or other parts of input elements or input zones. Preferably, the surfaces of input elements follow the shape of the input surface. Alternatively, the input surface maybe made of a single, continuous volume of material which may hide or obscure the input elements below the continuous surface material. This may be advantageous because input elements may be placed at locations that may otherwise disorient the users into using an embodiment of the present invention as visually perceived rather than as intended for proper operation. If the input elements are covered by an input surface, users may not see the positions of the elements and, therefore, may not become disoriented. Instead, input zones, representative of input elements but not showing the shapes and/or locations of the input elements may be used to help orient a user for operating an embodiment of an input device or system of the present invention.

In general, a symbol legend (i.e., a chart of stokes corresponding to symbols) typically does not need to be present on or near the input surface since a sequence of input elements necessary to enter a symbol may be determined by handwriting known symbols over the input surface. However, the input surface may show a symbol legend and/or corresponding strokes representing associated input for data entry of symbols and functions, such as if sweeps, other than regular handwriting strokes, may be used for representation of symbols and functions (i.e., unknown sweeps corresponding to symbols and functions which may or may not require memorization for efficient use). For example, the organization and placement of symbols on an input surface of an embodiment of the present invention may provide a user with an understanding of sweeps required to enter the symbols.

A user may draw sweeps using an input object over an input surface interacting with input elements. The input object may be any kind of interaction object. For example, it could be a finger, a thumb, a stylus, a laser pointer, a cursor, an image of an object, or a two-dimensional shape. Any type of interaction between an input object, and input elements such as touching, pressing, visual intersection, proximity, or pointing may be used for detection of interaction of an input element by an input object.

In the process of drawing a sweep, an input object interacts with a sequence of at least two input elements. A processing device typically traces a sweep from the moment when the input object starts to interact with a first input element until the moment when the input object ceases to interact with the last input element. A user can slide an input object at any comfortable speed for handwriting or other sweep recognition. Embodiments of the present invention typically do not have a time constraint or require or prohibit a time delay. Only the sequence of interacted input elements may be important for further processing. Such time-independence may be an important factor for allowing comfortable use of the input device.

An area of contact between an input element and an input surface could be any shape and size, such as a small dot of a stylus or a larger spot for a finger, as large as about 15 mm in diameter. Accurate processing of a wide input object interacting simultaneously with several input areas is another advantage of embodiments of the present invention.

At any given moment, an input element interacting with the input surface may interact with none, one, or multiple input elements. Various sequence processing algorithms may be employed to interpret and track sweeps of an input object according to the present invention and, typically, based on the configuration of the particular embodiment of an input device or system of the present invention. For example if the input object element does not interact with any of the input elements, then an input sequence may, or may not, be updated depending on the sequence processing algorithms for the embodiment. If an input element is the only element interacting with the input object, this input element may be added to the input sequence. When the input object interacts with several input elements, several approaches can be used to handle the necessary additional processing: (i) ignore all multiple input elements in any set and do not update the input sequence; (ii) select one input element in any set of input elements using a predefined simple rule such as selecting a subsequent but not preceding input element; (iii) measure a specific value of interaction and select an input element having the largest value; or (iv) determine a specific point within a contact area to be used for selection of an input element. The first approach may be applied for implementations of input elements providing information about all interacting elements simultaneously. An example may be the use of matrix scanning. The second approach selects one input element using a simple rule. For example, the input element with the smallest number may be selected. This approach could be implemented at the hardware level using a simple resistive chain. Another example rule may be selecting a subsequent input element, but not a proceeding input element at least until the current input element has been selected independently. The third method could be applied if more sophisticated input elements and/or sensors are used that are capable of measuring different characteristics of interaction, for example, area of contact or force values. The fourth technique may be applicable if high-resolution input elements and/or sensors are used. This technique also could be implemented at the hardware level. For example, this may be convenient for implementations using touch sensitive screens. One possible drawback of this approach is unstable behavior of this method in situations where a calculated point is near a border or borders of adjacent input areas. Due to changes of position and shape of the contact area, the input point could be switching chaotically between adjacent input zones. This problem may be solved by creating a gap between input zones and, thereby, using non-adjacent input zones, similar to the use of non-adjacent input elements. The width of this gap may depend on the accuracy of the sensors being used. For example, for wide input objects, a gap may be about half of the width of the input object. The last interacted input zone and input element may be considered active until the input object, such as a laser point, is projected into another input zone alone or an input object interacts with only one input element.

Gaps between input zones and input elements may be less, approximately equal to, or greater than the width of an input object. For example, input elements may cover an input surface in such a way with gaps generally less than the width of an input object that an input object always interacts with one or several input elements. In such layouts, additional detection of interaction with the input surface may not be necessary because detection could be derived solely from interaction with input elements. Gaps between input elements may also be generally greater than the width of input objects. Such layouts may simplify processing algorithms. For example, a processing algorithm may be simplified if the gap between touch sensitive input elements is greater than the width of the input object because this prevents an input object from interacting with more than one input element at one time when in contact with the input surface.

An input surface may use any type of detection of interaction with the input object. Example detection methods include, without limitation, electronic, electromechanical, proximity, mechanical, and visual. An input surface may be a touch or force sensitive surface. Optical detection of interaction by image or video processing is also possible. Generally, any type of detectable interaction between the input surface and an input object may be used for sweep detection according to an embodiment of the present invention. A visual, audio, or other feedback signal may be generated as a confirmation of interaction with an input surface, such as a beep sound or back lighting.

As is the case with an input surface, input elements may use any type of detection of interaction with an input object. For example, input elements may be electronic, electromechanical, membrane, mechanical, or optical switches. Input elements may be resistive, capacitive, touch, or force sensitive sensors. Users generally may be familiar and comfortable with these types of sensor activations. Additionally, input surface optical detection of interaction is also possible. Generally, any type of detectable interaction between input elements and input object may be used for detection of input element activation and sweep detection. A visual, audio, or other feedback signal may be generated as a confirmation of interaction between input element and input object.

A data entry system may include a processing device that detects the interaction of an input object with the input surface and/or input elements and then tracks a sequence of input elements being interacted with by the input object. Upon detection of the activation of the input surface or a first input element, the processing device may collect a sequence of input elements interacted with by the input object until the input surface is deactivated or the input object interacts with a last input element, and a processing function is output corresponding to the sequence of input elements representing symbols or function data entries, such as but not limited to the sequence processing described in International Application WO 99/56238.

A processing device may use different techniques for registration of interactions of an input object with input elements. Matrix scanning may be used, such as when input elements are associated with nodes of a matrix. This may require a small number of input/output (I/O) lines for the processing device. In other embodiments, the processing device may use simple resistive circuits for selection of only one input element even if several input elements are interacting with an input object.

A processing device may be coupled with an embedded display or may use a remote display of a target device. In addition, a processing device may be combined with an input surface or may be a separate device. A processor may also be embedded into or with an input object. A processor may be capable of communicating with different parts of a data entry device or system using a wired connection or by using radio, infrared, optical, or other types of wireless transmissions. For example, a stylus could have an embedded RF transmitter to relay signals from an optical sensor of the stylus to a process of the input device.

Symbols and functions may be represented by groups of sequences of input elements, such as "ordered sequences" (non-handwriting stokes and sweeps for symbols and functions which are intuitively formed from sweeps based at least in part on the placement and/or order of visual symbol labels on an input surface and zone separations thereof) described with reference to FIGS. 12-14 and 17-21 and typically representative of ordered rotations through continuous input element zones and sliding between input element zones of an input surface. Each symbol or function may have multiple representations. Each representation group may include one or more sequences of input elements. This is consistent with uni-stroke and multi-stroke representations of symbols and functions. Each sequence may have any number of input elements. Input elements in a sequence may follow in any order, and may be repeated.

Groups of symbol and/or function representations may create a dictionary or dictionaries of sweeps. Sweeps may be added or removed to and/or from a dictionary by a user. User control of symbol and function representations allows easy adaptation of embodiments of the present invention to different writing styles, languages, and alphabets. A dictionary could be stored using different data representations as a linked list of sweeps, a branching tree, or other suitable data structure. Different compression techniques may be applied to compress the dictionary. A representation of a dictionary may typically provide fast search capabilities for any given sweep or group of sweeps. Dictionaries may be loaded to and/or from external memory.

An input element may be a member of one or more sequences for symbols and functions and may occur several times within a single sequence for a symbol or function.

A function or symbol is activated when the associated sequence of input elements is utilized by a stroke, the drawing of a graphic, the writing of a symbol, or other input object sweep representative of the symbol or function. A processing device may detect the activation of the input elements as well as the activation of the corresponding sequence of elements. Once the current sequence of elements is complete, the processing device attempts to activate a function or identify a symbol corresponding to the sequence. If a sequence does not correspond to any input function or symbol in the dictionary, an error signal and/or request for the addition of a new stroke to the dictionary may be generated or no action may occur. If a sequence corresponds to a stroke of a multi-stroke symbol or function, processing may continue. If a sequence is the last stroke in a multi-stroke symbol or function representation, the corresponding symbol or function may be generated and/or stored in memory. Alternatively, symbol and function recognition may be executed in parallel during the process of tracking a sequence of input elements. In this case, a prediction of a symbol or symbols or a function or functions based on the partial sequence of input elements is possible.

Additionally, audible or visual feedback may be provided. For example, a sound may be issued when an input is recognized or when an error occurs. Visual feedback includes, without limitation, such indicators as LED lighting, a color change, or both. Advantageously, the registration of a sweep may be independent of any time constraint; no timer delays or counters may be required.

Figure 1:
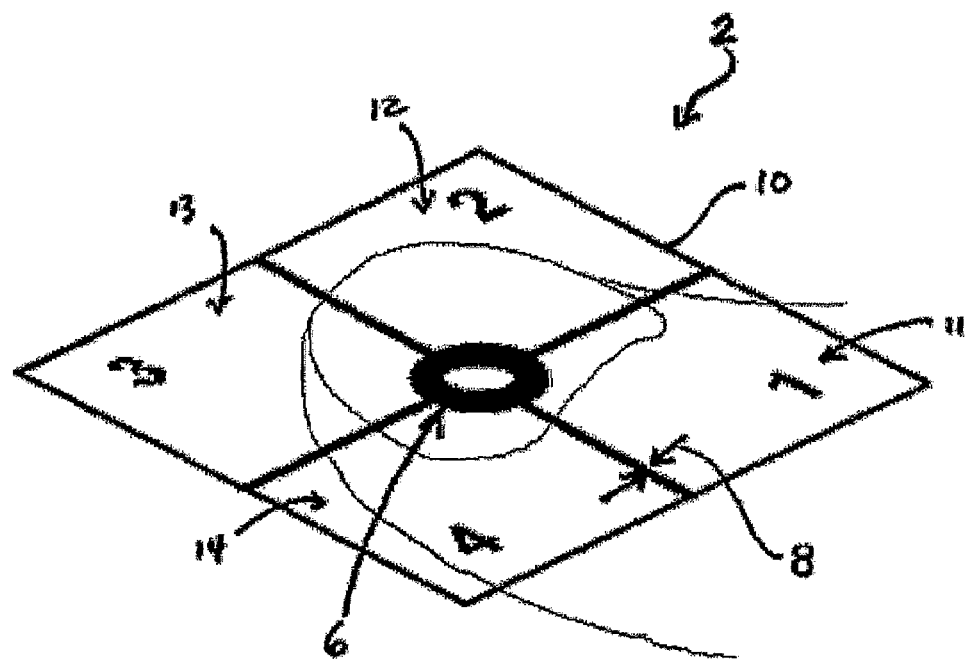
FIG. 1 is a diagram of a data entry system input surface with four rectangular input elements of an embodiment of the present invention.

FIG. 1 shows an embodiment of an input surface 10 for a data entry device 2 of the present invention with 4 input zones 11, 12, 13, 14 covering the flat input surface 10 with gap 8 less than a typical or average finger width between input zones. The central part 6 of the input surface 10 may be rounded and raised to provide additional tactile feedback and orientation and to prevent a user from interacting with multiple input elements simultaneously which would be located beneath or as part of the input surfaces 10. Optionally, joystick or directional pad (d-pad) may be placed at this central part 6.

A finger typically touches 1 or 2 input zones 11, 12, 13, 14 at any time. Processing of simultaneous interaction with two input zones depends on the embodiment and implementation of a processing device and processing algorithms as described herein.

The data entry device may have LEDs for visual feedback. Audio signals may be included for audio feedback.

Figure 2:
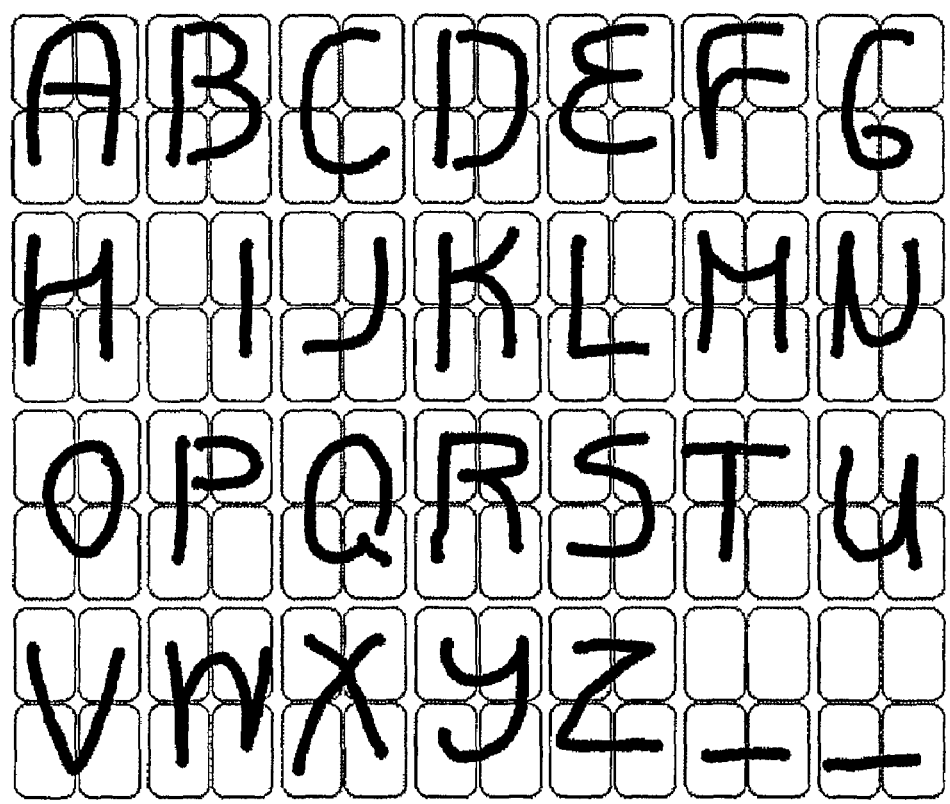
FIG. 2 is a diagram of representations of symbols for a 4-input element input surface of an embodiment of the present invention.
Figure 3:
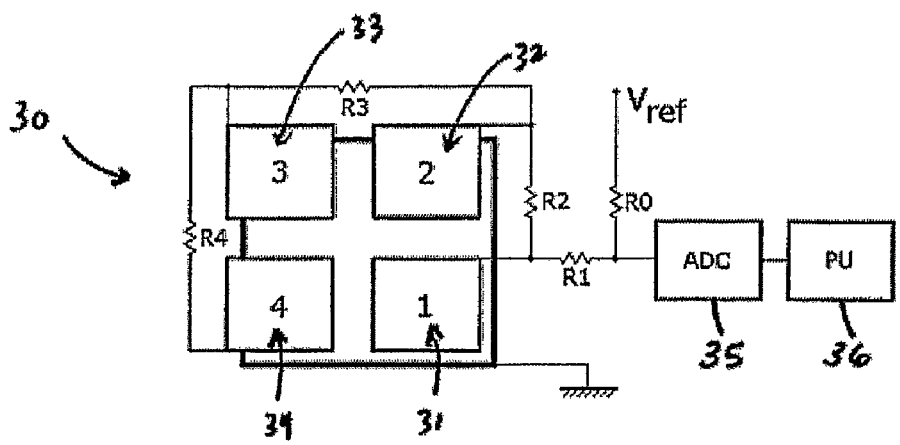
FIG. 3 is a schematic diagram of a data input device of an embodiment of the present invention with four input elements using five resistors.

FIG. 2 is a diagram of representations of a set of symbol strokes for a Latin alphabet using a 4-input element device as shown in FIG. 1.

FIGS. 3, 4, 5, and 6 illustrate four different hardware implementations of embodiments of the present invention, such as the device of FIG. 1. The electronic scheme in FIG. 3 has five resistors R0, R1, R2, R3, R4 in series sequentially connecting four conductive input elements 31, 32, 33, 34. These input elements cover one-side conductive layers and may be separated by small spacers. All of the resistors may have the same value of resistance. Depending on what input element is touched by a finger, the data entry device 30 creates four different values of cumulative resistance and input voltage such as used for analog to digital conversion by an analog-to-digital converter (ADC) 35 connected to a processing device or unit (PU) 36. This circuit provides correct processing of situations when an input object touches several input elements simultaneously. For example, the area corresponding to smaller resistance may be selected automatically. This embodiment requires one resistor per input element; thus, this type of implementation may typically be used for devices with a small number of input elements.

Figure 4:
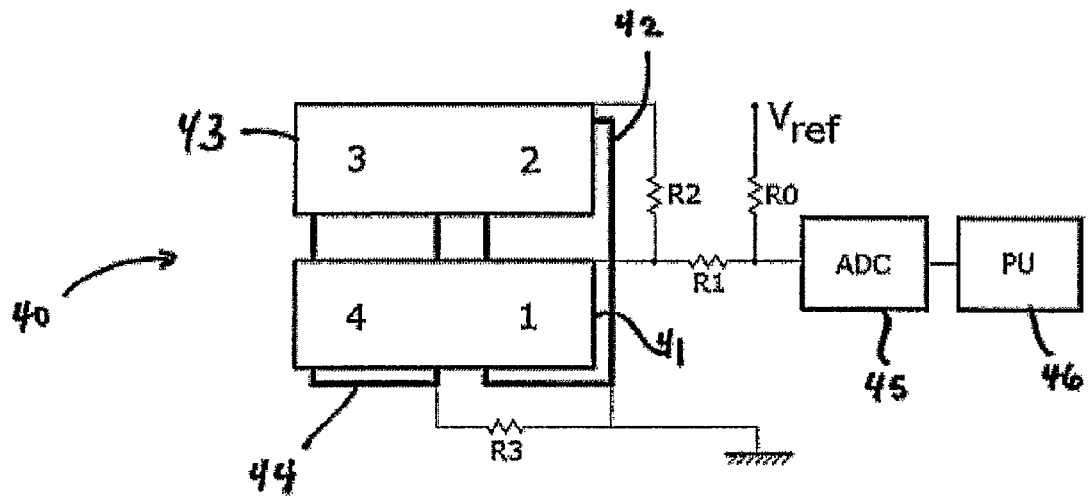
FIG. 4 is a schematic diagram of a data input device of an embodiment of the present invention with four input elements using four one-side conductive strips and four resistors.

The embodiment of FIG. 4 uses only four resistors R0, R1, R2, R3 and four one-side conductive strips 41, 42, 43, 44 facing with conductive sides toward each other. The resistance of a resistor R2 between horizontal strips 41, 43 is different than the resistance of the resistor R3 between vertical strips 42, 44. For example, the difference between the resistors R2, R3 could be a 2:1 ratio. The four different possible cumulative resistances for interaction of input elements (the overlapping regime of horizontal and vertical strips) in this embodiment are (R0+R1), (R0+R1)+R2, (R0+R1)+R3, and (R0+R1)+R3+R2. Therefore, depending on what input element is touched by a finger, four different values of cumulative resistance and input voltage are possible for analog to digital conversion by an ADC 45 connected to a PU 46. This circuit also provides correct processing of situations when an input object touches several input elements simultaneously; for example, where the area corresponding to the smallest resistance may be selected automatically. This embodiment requires fewer resistors (one per each row and column) and may be easily adapted to other layouts with more input elements (e.g., 2×3 or 3×3).

Figure 5:
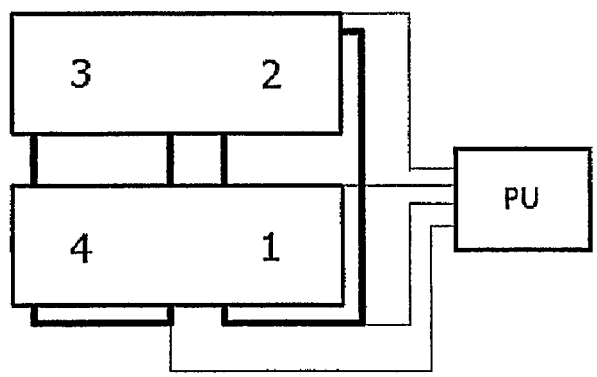
FIG. 5 is a schematic diagram of a data input device of an embodiment of the present invention with four input elements using four one-side conductive strips and a scanning algorithm.

The embodiment of FIG. 5 uses a traditional row/column scanning approach. For this embodiment a different processing algorithm may be used; e.g., typically if the input object interacts with several input elements, all of the input elements may be ignored. An input element may be added to a sequence if the input element is different from the last element in the sequence and is the only input element interacting with the input object at the moment.

Figure 6:
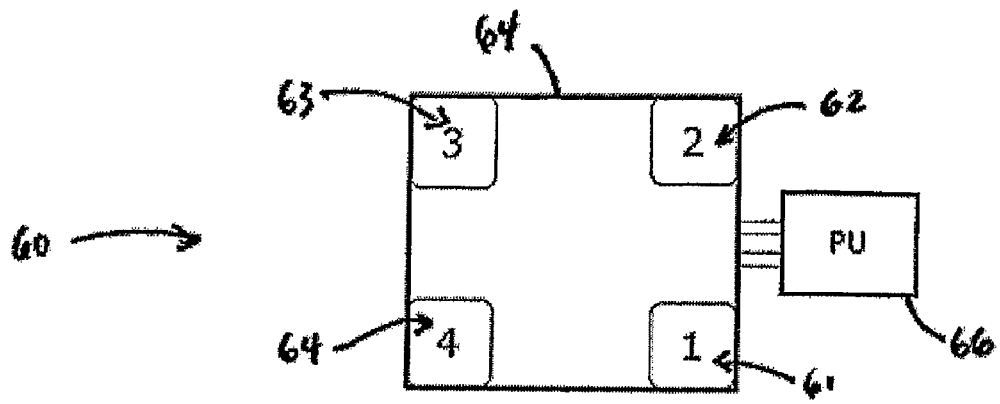
FIG. 6 is a schematic diagram of a data input device of an embodiment of the present invention with four separated force-sensitive input elements.

The embodiment of FIG. 6 uses an input surface 64 with four force sensitive input elements 61, 62, 63, 64. Values of forces of interaction by an input object are measured, and the input element having the highest value may be selected by the PU 66 as the input element with which the input object is interacting. To increase reliability of this method of detection, the highest value may be greater than the second value in a proportion such as 20% greater. This creates gaps between input elements in which no one element is considered as being interacted with by an input object. As for the previous embodiment of FIG. 5, an input element may be added to a data entry sweep sequence if the input element is different from the last element in the sequence and is the only input element interacting with the input object at a particular moment. Instead of force-sensitive sensors, other sensors could be used including resistive and capacitive sensors.

Figure 7:
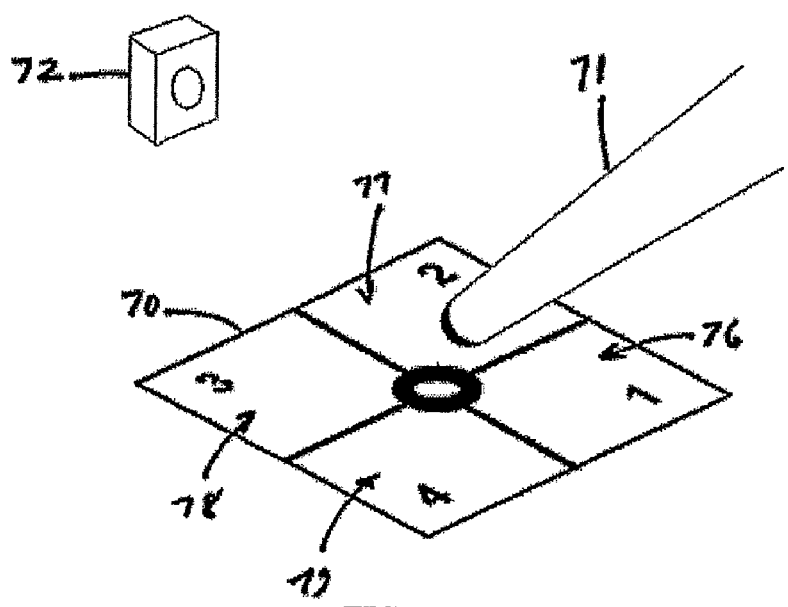
FIG. 7 is a diagram of a data entry system of an embodiment of the present invention using optical recognition of strokes and no sensitive input elements.

FIG. 7 shows an embodiment of the present invention using optical recognition of sweeps of an input object 71 without the use of a sensing input surface or input elements. For example, a visual sensor such as a camera embedded in a targeting device 72 may observe the input surface 70 and the input object 71 sweeping symbols and/or functions at the input surface. In an embodiment of the present invention like that of FIG. 7, input zones 76, 77, 78, 79 may be visible parts of input surface 70. Input zones may be projected or display on the input surface 70. Video processing software may track a fingertip or the end of another input object 71 over the input surface 70 and determine which input zone is interacted with by the input object at any moment. Also, the trace of a laser beam or other light emission could be tracked by a visual sensor of a targeting device.

Figure 8:
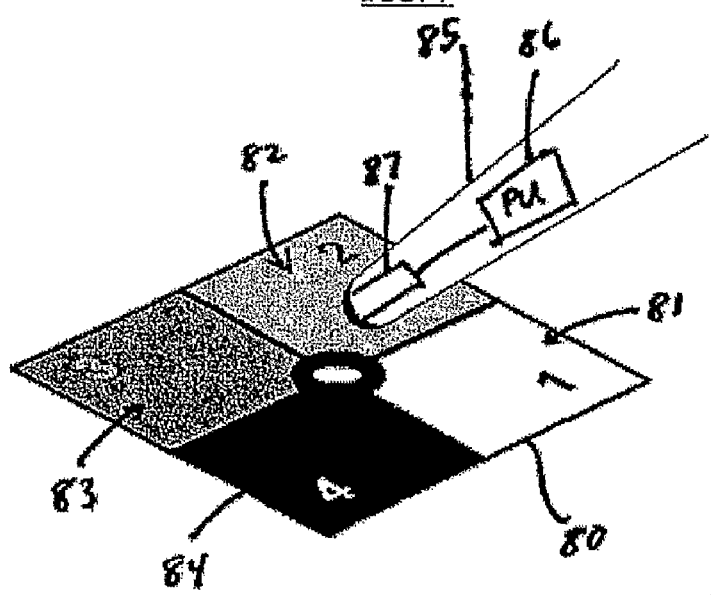
FIG. 8 is a diagram of a data entry system of an embodiment of the present invention with a processing device embedded in a pen device that makes use of optical recognition of color/patterned areas.

FIG. 8 shows an embodiment of the present invention with a processing device 86 embedded in a pen-shaped input object 85 that uses optical recognition of colored and/or patterned input zones 81, 82, 83, 84 representing input elements of an input surface 80. In this example embodiment, an optical detector 87 at the end of the input object 85 and a processing device 86 embedded into the input object 85 recognizes different colors, shades, patterns, or other specific optical properties of input zones and converts the sequence of areas into a symbol or function. The symbol or function may be wirelessly transmitted by the PU 86 to a target device such as a portable computer. Alternatively, the input object may include a visual sensor and a transceiver device to transmit the information of the visual sensor to a processing device not contained in the input object. The transceiver device may convert the information of the visual sensor into a sequence of input zones/elements which may be transmitted to the processing device not contained in the input object for conversion of the input zone/element sequence into a symbol or function. This latter example would allow the same input object to be used with different data entry devices according to the present invention which may include different sweep-to-symbol/function dictionaries. Other properties of different input regions may be used, such as electrical, optical, and mechanical. An associated sensor in an input object may determine interacting input elements based on these and/or other properties.

Figure 9:
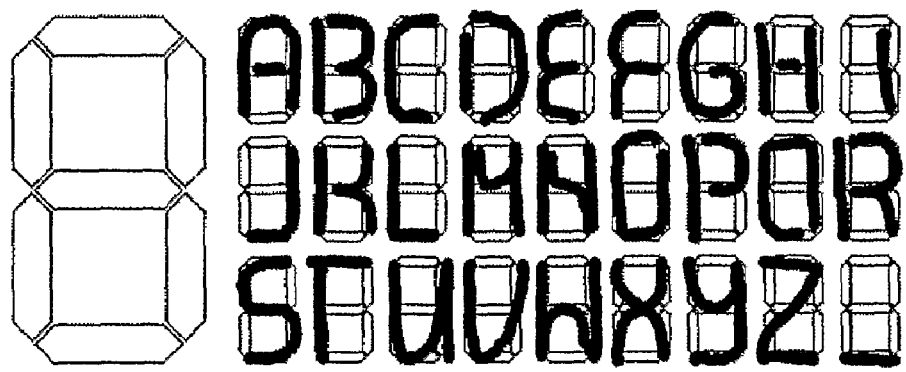
FIG. 9 is a diagram of a data entry input surface with 7 linear input elements arranged in the shape of a digital indicator for alphanumeric input of an embodiment of the present invention.

FIG. 9 illustrates an embodiment of the present invention with 7 linear input elements aligned in a shape of a digital indicator for alphanumeric input. Such digital indicators and corresponding shapes of digits and letters are well known and, thus, provide additional user guidance and comfort. Other symbols may be easily mapped onto this pattern. Some symbols such as H, K, M, N, W may be mapped to interact with the same elements, but in different orders which provides unique sequences of elements for such symbols.

A hardware and software implementation of this embodiment may use linear input elements, which could be raised over an input surface for better tactile feedback and guidance. A modified contact matrix scanning algorithm may be is used for determination of interacting input elements. For example, if more than one input element is interacting simultaneously, then a processing algorithm, such as one using an ignoring algorithm described above, may be used. Alternatively or in addition, the length of any input element may be longer than the width of an input object. As generally with embodiments of the present invention, input elements should be sized and designed such that there is a position on each input element where an input object interacts only with this input element. Thus, by creating input zones of an input surface or input elements where an input object may only interact with that one input element, an ignoring algorithm may be used to disregard positions of an input object where more than one input element is interacted with by an input object. Thus, a sequence of input element interactions may be created to represent a symbol. Unlike a high resolution input surface which only needs to know where a stylus or other input object is located during a stroke, embodiments of the present invention use input elements, typically either positioned with gaps greater than the width of an input object to prevent multiple input element interaction or using input elements that provide the ability to interact independently with the input elements in conjunction with an ignoring algorithm to disregard multiple input element interactions.

Figure 10A:
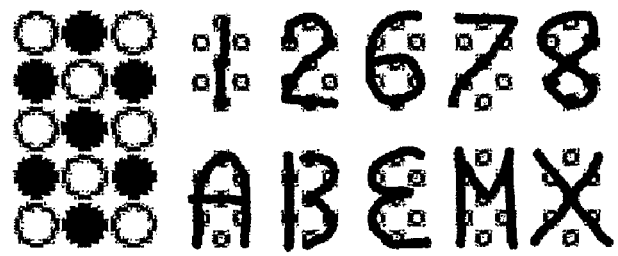
Figure 10B:
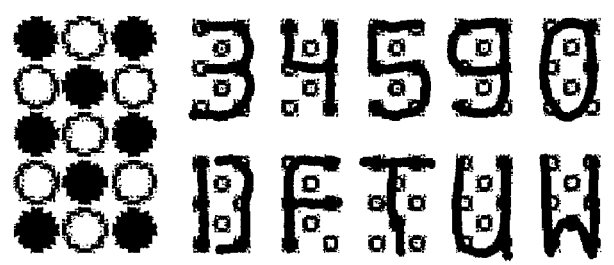

FIGS. 10a and 10b illustrate similar embodiments of the present invention with 7 and 8 dot input elements, respectively, based on a 3×5 symbol matrix. Such a matrix may also provide additional visual guidance for data entry and may allow for use of familiar symbol shapes.

Figure 11A:
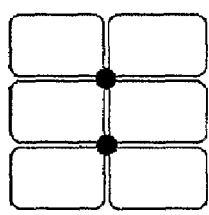
Figure 11A:
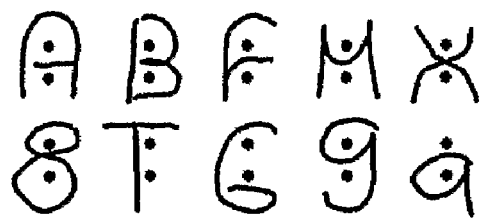
Figure 11B:
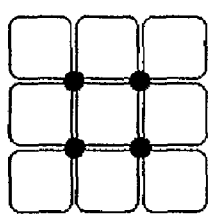
Figure 11B:
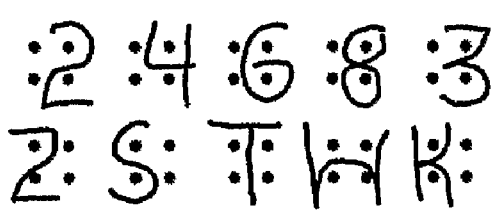

Embodiments of the present invention with 6 and 9 area input elements are shown in FIGS. 11a and 11b. These embodiments are similar to the embodiments of FIG. 1 and may use similar implementation techniques as presented in FIGS. 3, 4, and 5. They may also be implemented using sensors measuring pressure forces or similar interaction values as presented in embodiments of FIG. 6. If using sensors as in FIG. 6, input elements may be segmented areas of the input surface determined by proportions of force values at corners.

The previously described embodiments may use familiar handwriting shapes of symbols, but the present invention is not limited only to such shapes. Non-handwriting sweeps may also be used to represent symbol and functions according to the present invention. Simple sweeps may be used to speed up the input of data. The following embodiments of the present invention demonstrate different non-alphabetical or non-alphanumeric layouts which do not use traditional handwriting sweeps for data entry. These embodiments may show symbols or functions on the input surface to facilitate the input of data using these embodiments.

FIG. 12 shows an embodiment having 4 dot-sized input elements 341, 34, 343, 344 for numeric and symbol input. This embodiment provides a simple interface for input of 12 digits and symbols typical of a numeric keypad. To enter a digit, two corresponding elements may be connected. For example, to enter "3", the top input element 341 is connected to the bottom input element 343 corresponding with the position of the symbol label "3" below the top input element 341. The connection may be a single stroke of an input object. When interaction of the input surface by an input object discontinues, the data entry system may determine that a symbol input sequence has ended and may prepare for a subsequent symbol input sequence.

FIG. 13 shows an embodiment with 7 hexagonal input zones each with a dot input element 401, 402, 403, 404, 405, 406, 407. This embodiment provides input of as many as 42 (7×6) symbols or functions using simple strokes connecting pairs of input elements. For this layout only the first and the last elements of a stroke may be necessary to determine an inputted symbol or function. To enter a symbol or function, a stroke may be drawn from the input element showing this symbol to the input element at a position corresponding to the position shown for the symbol in the first input element. For example, to enter the letter "M" a stroke from the bottom input element 404 to the top input element 401 should be drawn with an input object.

The embodiment of FIG. 14 has 6 input elements 512, 513, 514, 515, 516, 517, arranged in 6 input zones 502, 503, 504, 505, 506, 507 of 46 sectors of a circle to create a "sliding dial" data entry input device. The embodiment of FIG. 14, as may other embodiments of the present invention, may be useful on a portable electronic device such as a mobile phone. Typically mobile phones operate either in a phone mode or in a text input mode. The embodiment of a data entry system of the present invention of FIG. 14 includes numeric data entry and text data entry. If a user wants to enter a number in text mode or text in number mode, a shift or mode switch key may be used. Typically, however, when a user wants to input a number, "*", or "#", the user simply strokes an input object from one of the input element zones to the input element zone which is adjacent to the desired number or symbol. For example, to enter a "2", the user strokes from the input element 517 and zone 507 showing the "2" counter-clockwise into the input zone 502 showing the "1". Just as numbers are associated with letters on a phone, the same numbers and letters are associated in the embodiment of FIG. 14. For example, "A", "B", and "C" are associated with "2" and "W", "X", "Y", and "Z" are associated with "9". To enter an "A", the user strokes from the input element 517 and zone 507 showing the "A" counter-clockwise one sector into the input zone 502 showing the "1". To enter a "B", the user strokes from the input element 517 and zone 507 showing the "B" counter-clockwise two sectors into the input zone 503 showing the "0". To enter a "D", the user strokes from the input element 517 and zone 507 showing the "D" clockwise three sectors into the input zone 504 showing the "8". To enter an "F", a user strokes from the input element 517 and zone 507 showing the "F" clockwise one sector into the input zone 506 showing the "4". Additional symbols, such as $ or @, or special letters, such as ö or ê, may be associated with "O", "#", "*", and "1". Other associations and programming algorithms may be used for other embodiments of the present invention to create other data entry systems in accordance with the present invention. When seeping around the input zones, moving around to the next zone gives the next letter. For example, rotating counter-clockwise from the "A" input zone 507 one sector produces an "A". Rotating another sector produces a "B". If a processing algorithm is used that detects first and last input elements, a user that rotates past a desired sector may return to the previous sector in a continuous sweep of an input object. Thus, if a user skipped a necessary letter, the user may slide the input object back until the desired sector, and symbol, is reached. This will avoid a user having to delete the incorrect entry and re-sweep the correct entry. This also avoids a user needing to cycle through the available letters and/or numbers associated with an input sector, similar to how many portable phones allow a user to enter text and/or numeric data in a phone book entry where pressing the same button cycles through numerous entries. For example, pressing a 5 button may cycle through 5, J, K, L, j, k, and 1; if the user passes the desired entry, the user must cycle back through the entire sequence to come to the desired entry. By comparison, an embodiment of the present invention may allow a user to reverse the direction of a sweep to achieve the correct total rotation of a sweep to arrive at a correct entry. For example, if the user attempts to enter an R, but rotates from the 7 input zone 505 clockwise 3 sectors, the user can reverse the sweep direction one sector to select an R. Similar embodiments with other numbers of sectors, such as 4, 8 or 12 sectors, are also possible. An embodiment with 12 input zones may provide one-touch input of digits and "a sliding dial" for other symbols.

FIG. 15 is a diagram of a data entry device 600 with four data entry input elements 614, 616, 618, 620 interacting with two input objects 630, 632. A first input object 630 is shown in three different positions 622, 624, 626. A second input object 632 is shown in a single position 634. The first input object 630 is a wide or broad input object such as a finger or a broad-tipped stylus. The second input device 632 represents a narrow-tipped stylus or similar fine resolution input object. Using a low resolution input surface 602 a high resolution input object such as a fine-tipped stylus 632 may be detected by the input surface 602 as interacting with a broader region 634 of the input surface. In such a manner, by using a low resolution input surface with a fine-tipped or small input object a broad input object is formed.

The input surface of FIG. 15 includes four dot input elements 614, 616, 618, 620. Alternatively, planar input elements 604, 606, 608, 610 may be used at the corner of the input surface 602 of a data entry device 600 of the present invention. Input elements may be positioned on an input surface to present an input object from interacting with two input elements at the same time. For example, even a broad input object 630 is not large enough to separate the gap or span between input elements 614, 616, 618, 620. If an input object is large enough to interact with two input elements, such as input elements 604, 606, 608, 610, a programming device may use an algorithm to determine which input element if any the input object is interacting with as described further herein. A sequence of interacting input elements may be formed by a sweep of an input object such as the input object 630 moving from a first position 622 to a second position 624 to a third position 626 to form a sequence of input elements beginning with the first input element 618, the second input element 616, and the third input element 614.

FIGS. 16a, 16b, 16c, 16d, and 16e are diagrams of interaction between three data entry input elements and an input object at various positions among the three data entry input elements. The three input elements 702, 704, 706 are positioned to allow an input object to interact with more than one input element at any time. The embodiments of FIGS. 16a, 16b, 16c, 16d, and 16e are provided herein to help further understand a programming device which may use an algorithm that relies upon determination of a first and last input element interaction and/or an input algorithm that determines which of two or more input elements currently being interacted with by an input object are, if any, added to a sequence for a symbol recognition input element interaction sequence. For example, in FIG. 16a the input object 710 is independently interacting with a first input element 702. By comparison the input object 710 is interacting with multiple input elements in the embodiments of FIGS. 16b, 16c, and 16d. Where more than one input elements are interacted with by an input object, a processing algorithm may disregard the interaction of multiple input elements at the same time. Alternatively, a programming algorithm may determine from pressure sensitive input elements which, if any, of the input elements are primarily interacted with by the input object. For example, it appears in FIG. 16b that the input object 710 may be interacting more with a first input element 702 than with a second input element 706 by the mere fact that a greater portion, and likely pressure, of the input object 710 is placed on the first input element 702 than on the second input element 706. Practicing algorithms of embodiments of the present invention may form sequences of input element interactions for recognition of symbols by disregarding any multiple input element interaction until a subsequent input element is interacted with independently by an input object. For example, if an input object 710 interacts with a first input element 702 as shown in FIG. 16a, the positions of the input element 710 in FIGS. 16b, 16c, and 16d may be disregarded until the input object 710 interacts with a single input element 706 as shown in FIG. 16e. Even if an input object interacts with two input elements not previously interacted with, a processing algorithm may disregard such interaction until a subsequent input element is interacted with independently by the input object. For example, although no shown in the embodiments of FIGS. 16a, 16b, 16c, 16d, or 16e, if an input object 710 were interacting with a first input element 704 and a second input element 706, after previously having independently interacted with an input element 702, the multiple interaction of the input object with input element 704 and input element 706 may be disregarded even though the previous input element 702 is not currently being interacted with.

FIG. 17 is an embodiment of a data entry system of the present invention with two horizontal bars for data entry input elements 791, 792. The input surface, or two input surfaces, may form two horizontal bars aligned linearly. This type or a similar data entry system could be used with small portable devices such as MP3 music players which typically have limited controls. By aligning the two horizontal bars, an input surface could be positioned on the side or along an edge of a device. Commands (functions) for the device may be input, just as symbols may be input, in an embodiment of the present invention. Simple sweeps of an input object may be used for a simple set of commands. For example, a finger or thumb may be used as an input object, and sliding the input object across sequences of input elements may produce commands for the device. The embodiment of FIG. 17 shows the ability using just two input elements to input six commands: PLAY, STOP, PAUSE, REWIND, NEXT/FORWARD, and PREVIOUS/BACK. More complicated input sequences may be used, but for exemplary purposes, FIG. 17 uses only six commands for six sequences. To produce a PLAY command only requires touching the left input element 791. To produce a STOP command only requires touching the right input element 792. To produce a PAUSE command, a user may slide or stoke a finger from the left input element 791 to the right input element 792. To produce a REWIND command, a user may slide or stoke a finger from the right input element 792 to the left input element 791. To produce a NEXT/FORWARD command, a user may slide or stoke a finger from the left input element 791, to the right input element 792, back to the left input element 791. To produce a PREVIOUS/BACK command, a user may slide or stoke a finger from the right input element 792, to the left input element 791, back to the right input element 792.

FIG. 18 is an embodiment of a data entry system of the present invention with two horizontal bars using four input elements for data entry. FIG. 18 is a more complicated embodiment using four input elements compared to the embodiment provided in FIG. 17. Each of the horizontal bars of FIG. 17 may include or be segmented into two input elements as shown in FIG. 18. The input elements may be adjacent or space apart to limit the chance for multiple input element interaction. Commands (functions) for the device may be input, just as symbols may be input, in an embodiment of the present invention. Simple sweeps of an input object may be used for a simple set of commands. For example, a finger or thumb may be used as an input object, and sliding the input object across sequences of input elements may produce commands for the device. The embodiment of FIG. 17 shows a data entry system 800 providing the user the ability to input six commands: PLAY, STOP, PAUSE, REWIND, NEXT/FORWARD, and PREVIOUS/BACK. These commands are represented by input sequences 814, 816, 818, 820, 822, and 824 from one input element to another. To input a PLAY command, for example, a user may stoke a finger from a first input element 806 to a second input element 808 of a first horizontal bar input surface 802. Similarly, to input a NEXT/FORWARD command, a user may stroke a finger from a second input element 808 of a first horizontal bar input surface 802 to a third input element 810 of a second horizontal bar input surface 804. An embodiment of a data entry system of the present invention as shown in FIG. 18 may provide a user the ability to input as many as 12 commands, as shown from the additional input sequences 830, 832, 834, 836, 838, and 840. Using a sequence of input elements, rather than allowing a single touch command such as pressing a single button or input element, to input commands may help to prevent accidental input of a command, such as when a user may grasp a device such as a small portable MP3 player in the user's hand. Although the user may interact with one or more input elements, the processing algorithm may disregard these interactions that do not result in the user inputting a sequence of input elements that represent a command. Various other embodiments in accordance with the present invention may be used to provide similar data entry systems for similar and other devices.

FIG. 19 is a diagram of a data entry input surface of an embodiment of the present invention with four input zones utilizing a circular pattern. FIG. 19 is the same basic embodiment of FIG. 1, but shaped in a circular pattern, having different alphanumeric variables, and requiring different strokes to process the alphanumeric variables. Like the embodiment of FIG. 14, symbols are entered in the embodiment of FIG. 19 by touching the correspondent sector and sliding around or across the center. For example, to enter "1" in a numeric mode, a user may be able to simply touch the corresponding top right zone. Alternatively, to enter a "1" in a numeric mode, a user may touch the top right zone and strokes (slides) to the bottom left zone. To enter "2" in a numeric mode, a user touches the top right zone and strokes counter-clockwise one sector. Other symbols may be entered similar to the embodiment of FIG. 14, where numbers and some symbols may be entered in a numeric mode and letters may be entered in a similar text mode. The embodiment of FIG. 19 requires a minimal number of sensitive zones for entry of a typical subset of symbols (those letters, number, and symbols typical of a touch-tone phone dial pad). The embodiment of FIG. 19 is also very compact, and may advantageously be useful for very small devices. FIG. 20 is a diagram of a similar data entry input surface of an embodiment of the present invention but with ten input elements utilizing two oval patterns. Embodiments of FIGS. 19 and 20 may have different shapes and be combined with additional regular buttons, such as a direction pad as in FIG. 20.

FIG. 21 is a diagram of a data entry input surface of an embodiment of the present invention with six input elements utilizing a circular pattern for a rotating dial. A rotating dial may be placed over input elements to add additional feedback as in FIG. 21. A rotating dial may be used for determination of a sweep, because an initial position, direction of dial rotation, and final position will uniquely determine a data entry sweep.

One of ordinary skill in the art will recognize that the present invention may be incorporated into hardware and software systems and subsystems for data entry devices. In these devices of the data entry systems, the device or system generally may include a computer system including one or more processors that are capable of operating under software control to provide the data entry of the present invention.

Computer program instructions may be loaded onto a computer or other programmable apparatus to produce a machine, such that the instructions which execute on the computer or other programmable apparatus together with associated hardware create means for implementing the functions of the present invention. These computer program instructions may also be stored in a computer-readable memory that can direct a computer or other programmable apparatus to function in a particular manner, such that the instructions stored in the computer-readable memory together with associated hardware produce an article of manufacture including instruction means which implement the functions of the present invention. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions of the present invention. It will also be understood that functions of the present invention can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A data entry system comprising:
an input surface having a limited number of non-adjacent input elements with gaps therebetween; and
a processing device adapted to:
detect a continuous sweep of an input object over an input region of the input surface, wherein the continuous sweep comprises a continuous surface interaction between the input object and the input surface;
trace an input sequence of the input elements interacted with by the input object during the surface interaction, wherein the input sequence is associated with no more than one input, wherein all inputs associated with input sequences are stored in a dictionary on a memory; and
unconditionally and immediately select the input associated with the input sequence from the memory and activate the input associated with the input sequence after the surface interaction is discontinued without interpretation of the input sequence, without further interaction of the input elements by the input object, and without external selection or confirmation of the input associated with the input sequence.

2. The system of claim 1, wherein the processing device is further adapted to convert input sequences into inputs.

3. The system of claim 2, wherein the processing device is further adapted to convert the input sequence into predicted inputs during the sweep.

4. The system of claim 2, wherein the processing device is further adapted to convert the input sequence into an input comprising a change at least one of the following parameters selected from the group of frequency, volume, bass, treble, fade, balance, play speed, listening speed, temperature, humidity, time, pressure, acceleration, weight, coordinate, distance, direction, angle, and position in a list.

5. The system of claim 2, wherein the processing device is further adapted to convert the input sequence into an input comprising one of the control functions selected from the group of (i) advancing the track of a digital media player, (ii) reversing the track of a digital media player, (iii) pausing the play of a digital media player, (iv) beginning the play of a digital media player, (v) stopping the play of a digital media player, (vi) advancing the play of a digital media player, (vii) reversing the play of a digital media player, (viii) increasing the volume of a digital media player, (ix) decreasing the volume of a digital media player; (x) control of burners of a stove; (xi) control of temperature of an oven, (xii) control of a timer associated with use of an oven; (xiii) control of temperature of a zone of a refrigerator or freezer, (xiv) control of humidity of a zone of a refrigerator or freezer, (xv) control of power level of a microwave, (xvi) control of cooking time of a microwave, (xvii) control of cooking modes of a microwave, (xviii) control of options of a microwave, and (xix) control of activation of a microwave, (xx) selecting a recorded program of a digital video recorder, (xxi) pausing the play of a digital video recorder, (xxii) beginning the play of a digital video recorder, (xxiii) stopping the play of a digital video recorder, (xxiv) advancing the play of a digital video recorder, (xxv) reversing the play of a digital video recorder, (xxvi) increasing the speed of play of a digital video recorder, (xxvii) decreasing the speed of play of a digital video recorder, and (xxiii) deleting a recorded program of a digital video recorder.

6. The system of claim 2, wherein the processing device is further adapted to convert the input sequence into an input comprising a change in selection of at least one of the following from the group of: (i) a language script element from a predefined set of language script elements, (ii) a value from a predefined set of values, (iii) a mode from a predefined set of operating modes, (iv) a menu item selected from a predefined set of menu items, (v) an operation selected from a predefined set of available operations, and (vi) a channel selected from a predefined set of available channels.

7. The system according to claim 1, wherein the processing device is further adapted to detect interaction with input elements from when the input object starts interacting with the input surface to when the input object stops interacting with the input surface.

8. The system according to claim 1, wherein the processing device is further adapted to detect an input sequence when the input object interacts with more than one input elements simultaneously.

9. The system according to claim 1, wherein the input elements are positioned and spaced about the input surface in such a way that the input object interacting with the input surface also interacts with at least one input element.

10. The system according to claim 1, wherein the processing device is further adapted to convert a group of input sequences represented by at least two consecutive surface interactions between an input object and the input surface into an input.

11. The system according to claim 1, wherein the processing device is further adapted to detect an unassociated input sequence and add an input sequence representation for an input by creating an association between the unassociated input sequence and the input.

12. The system according to claim 1, wherein the processing device is further adapted to delete an input sequence representation for an input by removing an association between a representation of an input sequence and the input.

13. The system according to claim 1, wherein the input surface is adapted to and the processing device is further adapted to permit the input object to be selected from any of the input objects of the group of: a finger, thumb, stylus, pen, laser pointer, cursor, image of an object, and a two-dimensional shape.

14. The system according to claim 1, wherein the input surface is further adapted to permit interaction of any of the input elements and input surface by interactions of the physical nature selected from the group of: electronic, electromechanical, proximity, mechanical, and visual.

15. The system according to claim 1, wherein at least one input element is defined by a shape selected from the group consisting of a dot, a line, and a planar area.

16. The system according to claim 1, wherein the input surface is a continuous volume of material.

17. The system according to claim 1, further comprising a touch-sensitive display covering at least a portion of the input surface.

18. The system according to claim 1, further comprising a plurality of displays covering a corresponding plurality of input zones.

19. The system according to claim 1, wherein the input surface includes at least one tactile feature selected from the group of: grooves, bumps, lines, and dots.

20. The system according to claim 19, wherein the tactile features define the input element zones.

21. The system according to claim 1, wherein the input surface includes at least one of backlighting, static symbology displaying, and dynamic symbology displaying to provide visual feedback during interaction of input elements by an input object.

22. The system according to claim 1, wherein the input surface and the processing device are further adapted to detect continuous surface interactions between the input surface and the input object within an input region of arbitrary shape of the input surface.

23. The system according to claim 22, wherein the processing device is further adapted to detect interaction with input elements from when the input object enters into the input region of the input surface to when the input object leaves the input region of the input surface, wherein the interaction of the input object with the input surface is uninterrupted and continuous.

24. The system according to claim 1, wherein the processing device includes an electronic circuit which registers and processes interactions between the input surface and an input object.

25. The system of claim 1, wherein the processing device is further adapted to activate an input associated with the input sequence only after the sweep is complete.

26. The system of claim 1, wherein the processing device is further adapted to indicate an input associated with the input sequence during the sweep.

27. The system of claim 1, wherein the processing device is further adapted to provide an intermediate indication of the currently identified input associated with the current input sequence during the sweep and select for activation a final identified input associated with the input sequence after the sweep is complete.

28. The system of claim 1, wherein the input surface and processing device are configured as part of a device selected from the group consisting of a radio, a satellite radio, an MP3 player, a personal media device, a GPS device, a medical device, a computer mouse, a refrigerator, an oven, a climate control device, a portable computer, an electronic dictionary, a phone, a pager, a watch, a TV set, a dishwasher, a washing machine, a dryer, a thermostat, an alarm system control panel, an audio mixer, an automobile control panel, a security system, a smartcard, a remote control device, an industrial process control panel, and a portable input device.

29. A method of performing data entry, comprising the steps of:
    detecting interaction of at least a first input element of an input surface with an input object;
    detecting interaction of at least a second input element of the input surface with the input object, wherein the first and second input elements are non-adjacent to each other and spaced apart about the input surface by a gap therebetween, wherein the interaction of the first and the at least second input elements of the input surface with the input object comprises a continuous surface interaction between the input object and the input surface within an input region;

capturing an input sequence of input element interactions by the input object;

converting the captured input sequence into no more than one data entry input associated with the captured input sequence, wherein all data entry inputs associated with input sequences are stored in a dictionary on a memory; and unconditionally and immediately selecting the data entry input associated with the captured input sequence from the memory and activating the converted data entry input without interpretation of the input sequence, without further interaction of input elements of the input surface by the input object, and without external selection or confirmation of the data entry input associated with the sequence.

30. The method of claim 29, further comprising the step of unconditionally and immediately activating the single input associated with the captured input sequence after the surface interaction is discontinued.

31. The method of claim 29, further comprising the step of indicating an input associated with the captured input sequence during the sweep.

32. The method of claim 29, further comprising the step of interacting with the first and the at least second input elements which can be detected to create the input sequence related to at least one of the position and order of the input elements with respect to each other about the input surface.

33. The method of claim 29, further comprising the steps of interacting with at least two input elements simultaneously, wherein the interaction of at least two input elements simultaneously is detected as one of the interactions selected from the group of: an interaction with the input element first individually interacted with, an interaction with the input element last individually interacted with, an interaction of none of the input elements, an interaction with a group of all input element individually interacted with; and an interaction with the input element most prevalently interacted with by the input object.

34. The method of claim 29, wherein the input sequence is formed in accordance with at least one of the position and order of the input elements with respect to each other about the input surface.

35. The method of claim 34, wherein the input sequence is formed by an ordered sequence of rotation through at least two input elements of a plurality of input elements positioned in a closed curve about the input surface.

36. The method of claim 35, wherein the input sequence is formed by position of the first element of the curve, the rotational direction of the ordered sequence along the curve, and the number of input elements in the sequence between the first and last input elements, and wherein the number of input elements in the sequence takes into account any complete revolutions of a loop of the close curve.

37. The method of claim 29, further comprising the step of operating an electronic device using the captured data entry sequence.

38. The method of claim 37, wherein the step of operating a compact electronic device includes operating a device selected from the group consisting of: a portable electronic device, a media player, a portable computer, a mobile phone, a pager, a personal data assistant (PDA), a portable medical device, a global positioning system (GPS) device, a dictionary, a translator device, a personal information manager, a labeler, and a watch.

39. A data entry device comprising at least two non-adjacent input elements defining input element zones of an input surface, wherein the non-adjacent input elements are separated by gaps therebetween and adapted to sense an input object touching the input surface to create a data entry input sequence from a single continuous sweep of the input object, wherein at least one of the input elements is defined by a shape selected from the group consisting of a line and a planar area, wherein the single continuous sweep comprises a continuous interaction between the input object and the input surface within the input region, wherein the data entry input sequence is associated with no more than one input, wherein all inputs associated with data entry input sequences are stored in a dictionary on the memory, the input associated with the data entry input sequence being unconditionally and immediately selected from the memory and activated without interpretation of the input sequence, without further interaction of input elements of the input surface by the input object, and without external selection or confirmation of the data entry input associated with the sequence.

40. The data entry device of claim 39, wherein the input surface is defined by at least one of the textures selected from the group of: smooth, bumped, ribbed, grooved, concave, convex, and curved.

41. The data entry device of claim 39, wherein data entry selected from the group consisting of letters of an alphabet, numbers, syllables, ideographic characters, script elements, strings, macros, continuous values, discrete values, list values, control parameters, control actions, functions, and symbols are entered by input sequences of sweeps between combinations of at least two input elements positioned about an input surface having non-adjacent input elements at the periphery of the input surface.

42. The data entry device of claim 39, wherein data entry selected from the group consisting of letters of an alphabet, numbers, syllables, ideographic characters, script elements, strings, macros, continuous values, discrete values, list values, control parameters, control actions, functions, and symbols are entered by input sequences of rotational sweeps through at least two non-adjacent input elements at rotational positions of input element zones about a round input surface.

43. The data entry device of claim 39, wherein a function is entered by an input sequence.

44. The data entry device of claim 43, wherein the function is a change selected from the group of parameters of frequency, volume, bass, treble, fade, balance, play speed, listening speed, temperature, humidity, time, pressure, acceleration, weight, coordinate, distance, direction, angle, and position in a list.

45. The data entry device of claim 43, wherein the function is a control function selected from the group of (i) advancing the track of a digital media player, (ii) reversing the track of a digital media player, (iii) pausing the play of a digital media player, (iv) beginning the play of a digital media player, (v) stopping the play of a digital media player, (vi) advancing the play of a digital media player, (vii) reversing the play of a digital media player, (viii) increasing the volume of a digital media player, (ix) decreasing the volume of a digital media player; (x) control of burners of a stove; (xi) control of temperature of an oven, (xii) control of a timer associated with use of an oven; (xiii) control of temperature of a zone of a refrigerator or freezer, (xiv) control of humidity of a zone of a refrigerator or freezer, (xv) control of power level of a microwave, (xvi) control of cooking time of a microwave, (xvii) control of cooking modes of a microwave, (xviii) control of options of a microwave, and (xix) control of activation of a microwave, (xx) selecting a recorded program of a digital video recorder, (xxi) pausing the play of a digital video recorder, (xxii) beginning the play of a digital video recorder, (xxiii) stopping the play of a digital video recorder, (xxiv) advancing the play of a digital video recorder, (xxv) reversing the play of a digital video recorder, (xxvi) increasing the speed of play of a digital video recorder, (xxvii) decreasing the speed of play of a digital video recorder, and (xxiii) deleting a recorded program of a digital video recorder, wherein the control function is entered by the input sequence.

46. The data entry device of claim 43, wherein the function is a change in selection of at least one of the following from the group of: (i) a language script element from a predefined set of language script elements, (ii) a value from a predefined set of values, (iii) a mode from a predefined set of operating modes, (iv) a menu item selected from a predefined set of menu items, (v) an operation selected from a predefined set of available operations, and (vi) a channel selected from a predefined set of available channels.

47. The data entry device of claim 43, wherein the function is an incremental change of a discrete parameter entered by the input sequence.

48. The data entry device of claim 43, wherein the function is an incremental change in a continuous parameter entered by the input sequence.

49. The data entry device of claim 47, wherein the value of the incremental change is constant.

50. The data entry device of claim 48, wherein the value of the incremental change is dynamic and depends upon at least one of the following parameters selected from the group of: (i) a current value of the parameter, (ii) length of the input sequence, (iii) duration of the sweep, and (iv) speed of the input object over the input surface.

51. The data entry device of claim 39, wherein an input is entered by an input sequence.

52. The data entry device of claim 51, wherein the input is explicitly defined in a dictionary with associations between available inputs and input sequences.

53. The data entry device of claim 51, wherein the input is implicitly defined by markings on the input surface.

54. The data entry device of claim 51, wherein the input sequence is formed by an ordered sequence of rotation through at least two input elements of a plurality of input elements positioned in a closed curve about the input surface, wherein the input is defined by a function depending upon position of the first element of the curve, the rotational direction of the ordered sequence along the curve, and the number of input elements in the sequence between the first and last input elements, and wherein the number of input elements in the sequence takes into account any complete revolutions of a loop of the closed curve.

* * * * *